United States Patent [19]

Salahshour

[11] 4,263,745

[45] Apr. 28, 1981

[54] PORTABLE LEAF CLEANER

[76] Inventor: Soheyl Salahshour, 440 E. Richmond Park, Apt. 222C, Richmond Heights, Ohio 44143

[21] Appl. No.: 75,850

[22] Filed: Sep. 17, 1979

[51] Int. Cl.³ .............................................. A46B 13/04
[52] U.S. Cl. ......................................... 47/1.5; 15/23; 15/102
[58] Field of Search ..................................... 15/23–24, 15/100, 102; 47/1.5

[56] References Cited

U.S. PATENT DOCUMENTS

| | | | |
|---|---|---|---|
| 3,128,492 | 4/1964 | Hanscom et al. | 15/100 X |
| 3,505,701 | 4/1970 | Keil | 15/102 |
| 3,512,202 | 5/1970 | Taylor | 15/23 |
| 3,551,932 | 1/1971 | Grossman | 15/23 |
| 3,892,004 | 7/1975 | Downes | 15/102 |
| 4,126,962 | 11/1978 | Polcaro | 47/1.5 |

Primary Examiner—Robert E. Bagwill
Attorney, Agent, or Firm—Isler and Ornstein

[57] ABSTRACT

A portable leaf cleaner is disclosed into which plant leaves to be cleaned or otherwise treated are introduced between rolls which apply a cleaning fluid to the leaves. Means are provided for controlling the flow of fluid to the rolls. One of the rolls is driven by a reversing motor while the other is frictionally driven by the first roll. The other roll is resiliently urged against the first roll, so as to be movable relatively to the first roll, to thereby prevent breakage or damage to the leaves as they pass between the rolls. The reversing motor is energized by a battery or cell, and the device is supported by a handle which is adapted to be grasped in one hand and has means associated therewith for controlling an electrical circuit which energizes the motor.

5 Claims, 5 Drawing Figures

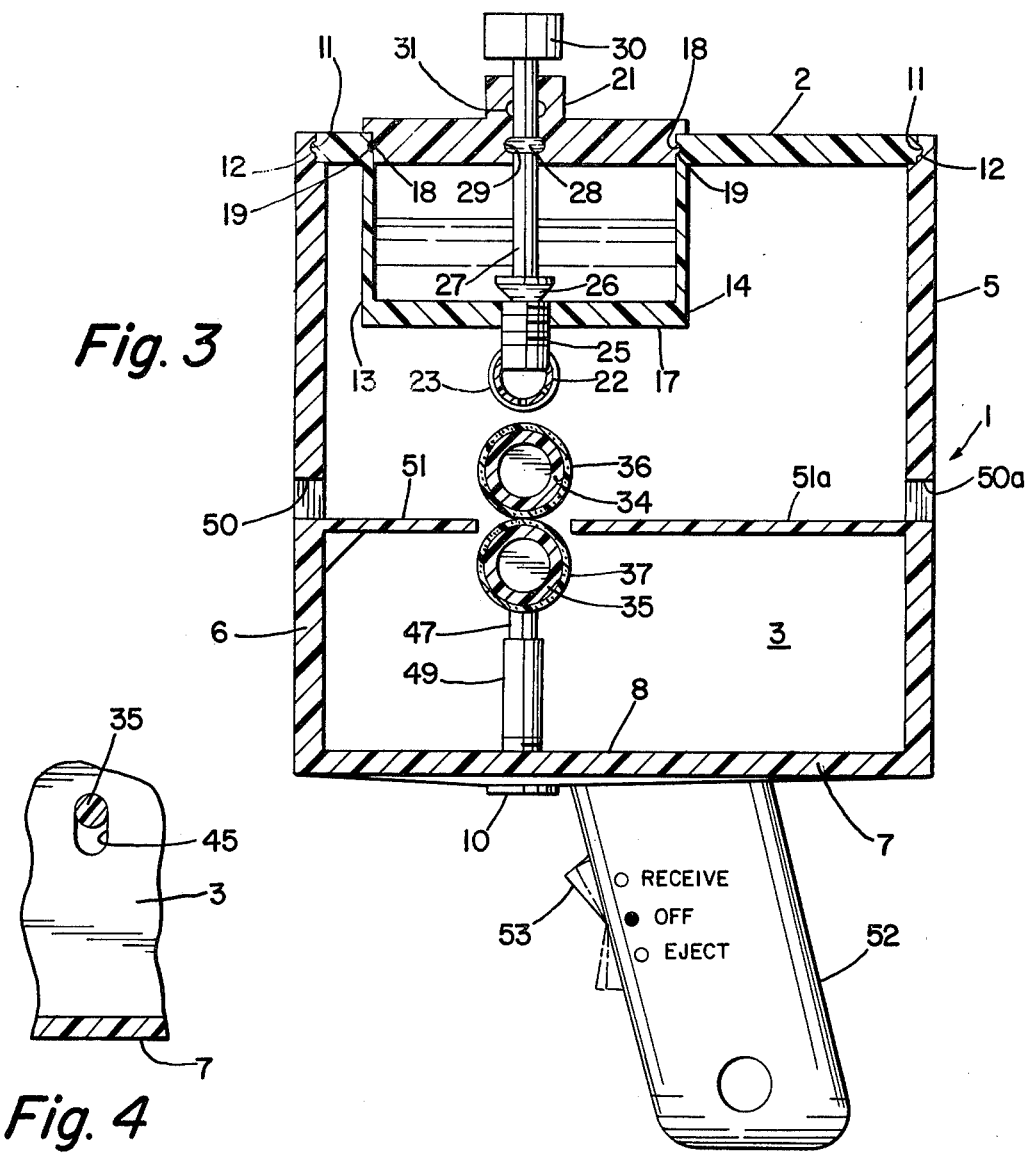
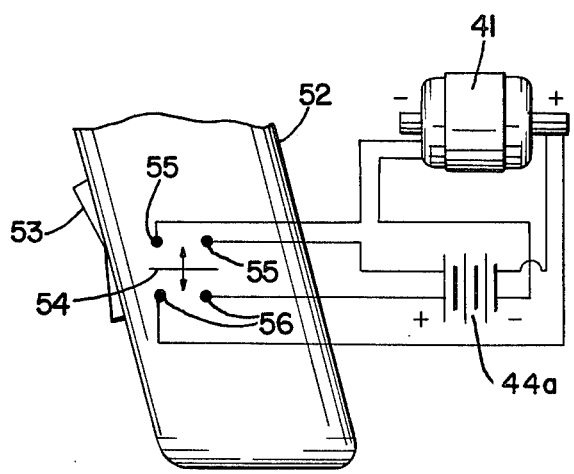
Fig. 3
Fig. 4
Fig. 5

PORTABLE LEAF CLEANER

This invention relates, as indicated, to leaf cleaners, but has reference more particularly to a portable cleaner for cleaning or otherwise treating the leaves of household plants and the like.

A primary object of the invention is to provide a leaf cleaner of the character described which is of relatively simple construction and can be easily carried or transported in one hand, to the plant whose leaves are to be cleaned or otherwise treated.

Another object of the invention is to provide a leaf cleaner of the character described having built-in means for cleaning or otherwise treating plant leaves without tearing or damaging the leaves.

Another object of the invention is to provide a leaf cleaner of the character described having means for feeding fluids to the leaves in predetermined or controlled amounts and for distributing such fluids uniformly over the surfaces of the leaves.

A further object of the invention is to provide a leaf cleaner of the character described having driven rolls for applying fluids to the leaves and means for reversing the direction of rotation of the rolls, whereby the leaves may be received between the rolls in one direction and ejected from the rolls in the opposite direction.

These and other objects and advantages of the invention will appear from the following description taken in connection with the drawings forming a part of the specification and in which:

FIG. 3 is a cross-sectional view, taken on line 3—3 of FIG. 2;

FIG. 4 is a fragmentary cross-sectional view, taken on the line 4—4 of FIG. 2; and FIG. 5 is a fragmentary view, showing the handle of the cleaner and a wiring diagram of the electrical system for energizing movement of the rolls and reversing the direction of rotation of the rolls.

Figure 1:
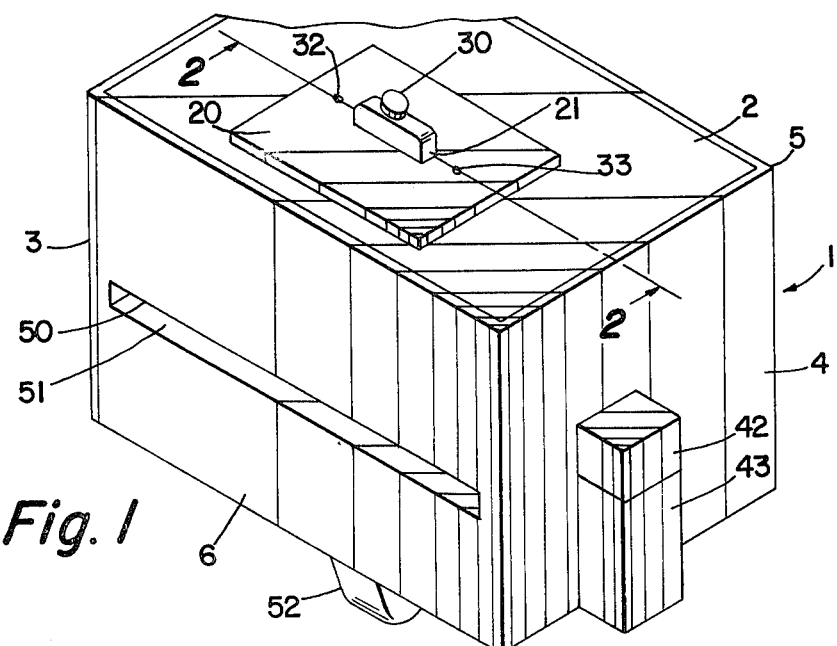
FIG. 1 is a perspective view of a leaf cleaner embodying the invention.

Referring more particularly to the drawings, the leaf cleaner will be seen to comprise a box-like receptacle or container 1 and a cover or closure 2.

The receptacle or container 1 is preferably molded or formed of a plastic of a somewhat soft or semi-rigid nature, to provide side walls 3 and 4, a back wall 5, a front wall 6 and a bottom 7.

Figure 2:
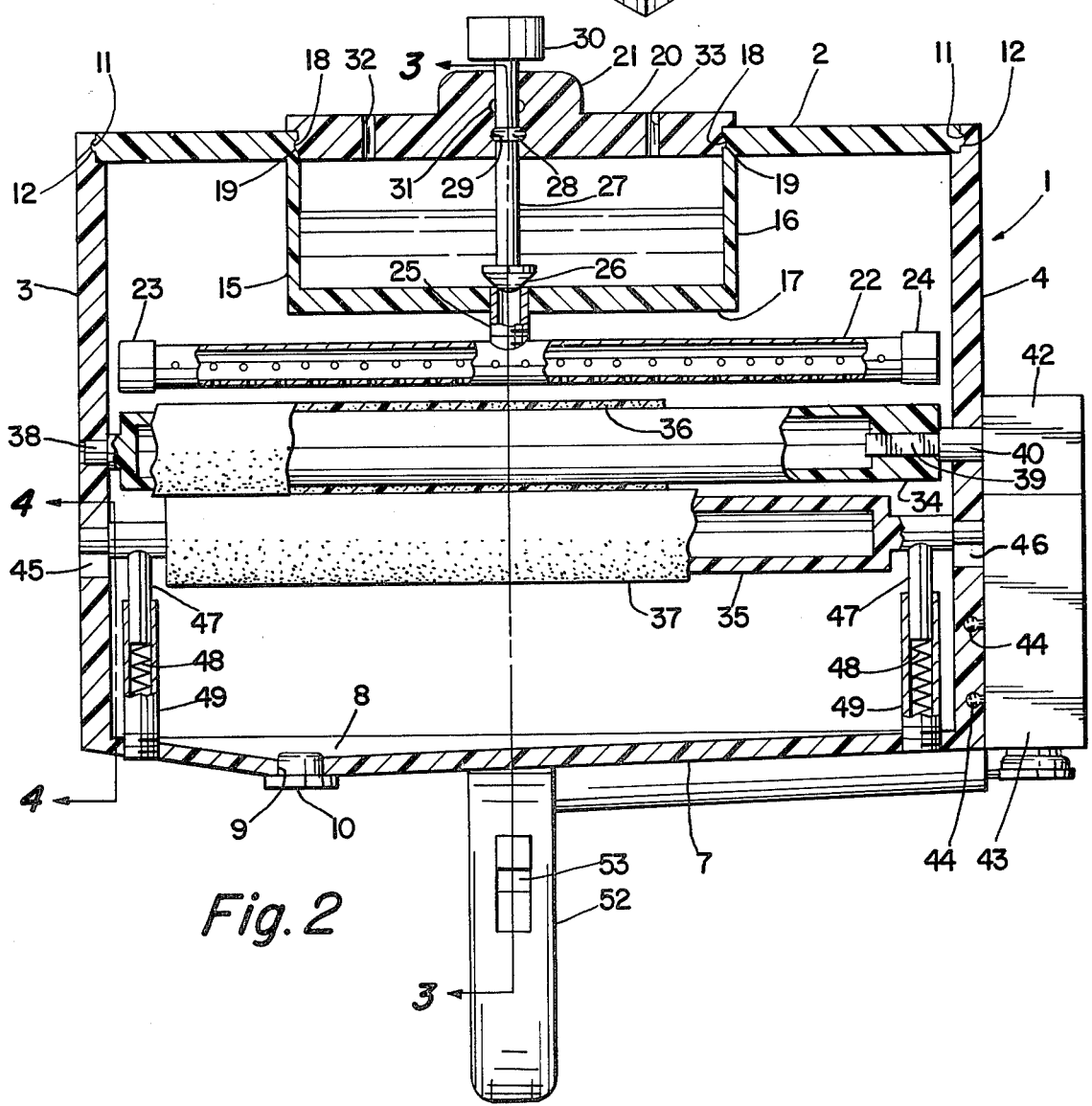
FIG. 2 is a cross-sectional view, taken on the line 2—2 of FIG. 1, with portions of the rolls coverings and other parts removed to more clearly show certain features of construction.

The bottom 7 is inclined or sloped, as best seen in FIGS. 2 and 3, to form a sump 8 for collecting used fluids, which may be periodically drained through a drainage opening 9, which is normally closed by a threaded removable closure or stopper 10.

The upper ends of the walls 3, 4, 5 and 6 are provided with a recess or groove 11 (see FIGS. 2 and 3) in which the tenon 12 of the cover or closure 2 is snappingly received for closing the receptacle or container 1.

The cover or closure 2 is also preferably molded or formed in a single piece of a plastic, of a somewhat soft or semi-rigid nature, to provide a dependent reservoir, of box-like form, comprising a front wall 13, a back wall 14, side walls 15 and 16 and a bottom 17.

The upper portions of the walls 13, 14, 15 and 16 of the reservoir are provided with a recess or groove 18 for snappingly receiving a tenon 19 at the periphery of a reservoir closure 20, which is also preferably molded or formed in a single piece, of a plastic of a somewhat soft or semi-rigid nature.

The closure 20 is provided with a handle 21 for removing the closure from the cover or closure 2, when it is desired to fill the reservoir with a fluid or replenish the fluid in the reservoir.

The reservoir is adapted to be filled with a fluid such as water, milk or beer, which are commonly used to clean or treat plant leaves.

The leaf cleaner also comprises a perforated tube 22, which extends transversely between the side walls 3 and 4 of the receptacle or container 1 and is closed at its ends by caps 23 and 24, the tube 22 being disposed below the bottom 17 of the reservoir.

The tube 22 is provided centrally thereof with an upstanding fluid-receiving tube 25, the upper end of which extends through and is connected to the bottom 17 of the reservoir to provide a passageway for flow of fluid from the reservoir to the tube 22.

The tube 25 is normally closed at its upper end by a valve 26 at the lower end of a valve stem 27, which is retained in position by a bead 28 molded integrally with the valve stem and which is snappingly received in an annular recess 29 in the closure 20.

The valve stem 27 is provided at its upper end with a knob 30, whereby the valve 26 may be lifted to thereby open the valve and permit flow of fluid into the tubes 25 and 22, the bead 28, in the course of this opening movement, being lifted to a position wherein it snaps into a second annular recess 31 in the closure 20, to thereby retain the valve 26 in open position.

In order to permit flow of atmospheric air into the reservoir and to avoid formation of a vacuum in the reservoir, the closure 20 is provided with spaced air inlet openings 32 and 33.

The leaf cleaner further comprises a pair of rolls or rollers 34 and 35 disposed below the tube 22 and extending transversely between the side walls 3 and 4 of the receptacle or container 1. The roller 34 is provided with a covering 36 of porous foam rubber or like material and the roller 35 is similarly provided with a covering 37 of porous foam rubber or like material.

One end of the roll 34 is provided with a trunnion 38, which is journalled for rotation in the side wall 3 of the receptacle 1, while the other end of the roll 34 is driven by a squared portion 39 of the drive shaft 40 of the reversing electric motor 41, which drive shaft, as seen in FIG. 2, extends through the side wall 4 of the receptacle 1.

The motor 41 is enclosed within a housing consisting of an upper portion 42 mounted on the side wall 4 of the receptacle 1 and a lower portion 43, which is removably secured by snap pins 44 to the side wall 4 and which encloses a battery or cell 45a (see FIG. 5), which energizes the motor 41.

The ends of the roll 35 extend into and are journalled for rotation in vertical slots 45 and 46 in the side walls 3 and 4 respectively, and are retained in the upper ends of these slots by means of plungers 47, which bear against the roll and are urged in an upward direction by means of compression coil springs 48.

The coil springs 48 are enclosed within cylindrical housings 49, the lower ends of which are threadedly secured to the bottom 7 of the receptacle 1.

The covering 36 of the driven roller 34 is thus in frictional contact with the covering 37 of the roller 35, so that when the roller 34 is driven, the roller 35 is simultaneously driven by the roller 34, but in a direction opposite to that in which the roller 34 is driven.

The front wall 6 of the receptacle 1 has an elongated slot or slit 50 (FIGS. 1 and 3) therein which extends transversely of the wall 6, at a level slightly above the level at which the roller coverings 36 and 37 contact each other, this slot being adapted to receive the leaf to be cleaned or otherwise treated.

The leaf to be cleaned or otherwise treated is adapted to be guided into the rolls 34 and 35 by a ledge or guide plate 51 (FIG. 3), which extends horizontally inward into the receptacle 1 from the front wall 6, just below the lower edge of the slot 50.

The rear or back wall 5 of the receptacle 1 has an elongated slot or slit 50a (FIG. 3) therein which extends transversely of the wall 5, at a level slightly below the level at which the roller coverings 36 and 37 contact each other, this slot being adapted to receive the leaf which is being cleaned or otherwise treated.

The leaf to be cleaned or otherwise treated, after passage through the rolls 34 and 35, is guided onto a ledge or guide plate 51a (FIG. 3) which extends horizontally inward into the receptacle 1 from the rear wall 5, just below the lower edge of the slot 50a.

The leaf cleaner further includes a handle 52, which extends from and is secured to the bottom 7 of the receptacle 1 and at an inclination which facilitates grasping of the device by the user.

The handle 52 is provided with a trigger 53, which controls the direction of rotation of the reversing motor 41.

With the trigger 53 in the neutral or "off" position, the switch 54 is open and the motor does not rotate the rolls 34.

With the trigger 53 in the "receive" position, the switch 54 closes the contacts or terminals 55 (see FIG. 5) causing the motor 41 to rotate the roll 34, and consequently the roll 35 to receive the leaf and pull it through the rolls in a direction toward the right, as viewed in FIG. 3.

With the trigger 53 in the "eject" position, the switch 54 closes the contacts or terminals 56, causing the rolls 34 and 35 to move the leaf toward the left, as viewed in FIG. 3, and thus eject the leaf from the rolls.

In the operation of the device, the device held in the hand by the handle 52, is moved toward a plant leaf or the like, and the leaf caused to enter the slot 50 and is guided along the ledge or guide 51 to the rolls 34 and 35.

The user will then raise the knob 30 to open the valve 26 and cause the fluid, water, milk or beer to enter the tubes 25 and 22, pass out of the perforations of the tube 22 and onto the covering 36 of the roll 34 and thence onto the covering 37 of the roll 35, until these rolls become saturated with the fluid.

The user will then press the trigger 53 to move the switch 54 to the "receive" position, causing the leaf to pass between the rolls 34 and 35 and become coated with the fluid to which reference has been made.

As the leaf passes through the rolls 34 and 35, it is guided onto the guide plate 51a and to the slot 50a, and if the leaf is long, a portion of the leaf may enter the slot 50a.

After the coating operation, the user will then press the switch 54 to the "eject" position, causing the leaf to pass in a reverse direction, out of the rolls and out of the slot 50.

After the coating or cleaning operation, the user will close the valve 36.

During the cleaning operation, the springs 48 urge the roller covering 37 toward the roller covering 36, thereby insuring that the fluid in these coverings is uniformly applied to the leaf which is being cleaned. At the same time, any excessive pressure against the leaf, due to variations in thickness in different areas of the leaf, is relieved by compression of the springs 48, so that the leaf cannot become broken, torn or otherwise damaged.

When sufficient used fluid accumulates in the sump 8, the closure 10 is removed to drain the sump and then replaced.

Although the portable leaf cleaner or cleaning device has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a portable leaf cleaner of the hand-held type, a receptacle having side walls, a slotted back wall, a slotted front wall and a cover, a first driven applicator roll mounted for rotation in said side walls, a second applicator roll disposed below said driven roll and mounted for rotation in said side walls, means mounted on one of said side walls for rotating said first applicator roll, means for resiliently biasing said second roll against said first roll, a fluid-containing reservoir disposed within said receptacle and supported by said cover, a perforated tube disposed within said receptacle above said first roll, said tube extending between said side walls, a second tube extending between said reservoir and said perforated tube and adapted to supply fluid from said reservoir to the interior of said perforated tube, and valve means for controlling the flow of fluid from said reservoir through said second tube.

2. A portable leaf cleaner as defined in claim 1, wherein said rotating means comprises a reversing electric motor for directly driving said first applicator roll in either direction.

3. A portable leaf cleaner as defined in claim 2, said biasing means comprising plungers disposed below said second roll and compression coil springs disposed below said plungers and urging said plungers upwardly.

4. A portable leaf cleaner as defined in claim 3, including a handle disposed below and extending from the bottom of said receptacle and adapted to be grasped by the user of the portable cleaner, a battery mounted on one of the sides of the receptacle and an electrical circuit for energizing said reversing motor and means associated with said handle for controlling said electrical circuit to control the direction of rotation of said reversing motor.

5. A portable leaf cleaner as defined in claim 1, wherein said rolls are provided with a covering of foam rubber.

* * * * *